(12) United States Patent
Zheng et al.

(10) Patent No.: US 9,341,774 B2
(45) Date of Patent: May 17, 2016

(54) OPTICALLY MATCHED LASER ARRAY COUPLING ASSEMBLY FOR COUPLING LASER ARRAY TO ARRAYED WAVEGUIDE GRATING

(75) Inventors: Jun Zheng, Missouri City, TX (US);
I-Lung Ho, Sugar Land, TX (US);
Hung-Lun Chang, Sugar Land, TX (US)

(73) Assignee: Applied Optoelectronics, Inc., Sugar Land, TX (US)

( * ) Notice: Subject to any disclaimer, the term of this patent is extended or adjusted under 35 U.S.C. 154(b) by 759 days.

(21) Appl. No.: 13/357,142

(22) Filed: Jan. 24, 2012

(65) Prior Publication Data
US 2013/0188951 A1    Jul. 25, 2013

(51) Int. Cl.
*H04B 10/00*     (2013.01)
*G02B 6/34*      (2006.01)
*G02B 6/12*      (2006.01)
*G02B 6/42*      (2006.01)

(52) U.S. Cl.
CPC .......... *G02B 6/12019* (2013.01); *G02B 6/4215* (2013.01)

(58) Field of Classification Search
CPC ..................................................... H04B 10/506
USPC ........................................... 398/68, 135, 140
See application file for complete search history.

(56) References Cited

U.S. PATENT DOCUMENTS

| | | | | |
|---|---|---|---|---|
| 4,720,163 A | * | 1/1988 | Goodwin et al. | 385/90 |
| 5,617,234 A | * | 4/1997 | Koga | G02B 6/12011 385/37 |
| 5,812,724 A | * | 9/1998 | Ohtsu | B82Y 20/00 385/123 |
| 5,946,331 A | | 8/1999 | Amersfoort et al. | |

(Continued)

FOREIGN PATENT DOCUMENTS

| EP | 2337240 A1 | 6/2011 |
|---|---|---|
| WO | 2013010166 A1 | 1/2013 |

OTHER PUBLICATIONS

Dr. Rüdiger Paschotta, "Arrayed Waveguide gratings", Oct. 18 2006, Encyclopeida of Laser Physics and Technology, http://www.rp-photonics.com/arrayed_waveguide_gratings.html.*

(Continued)

*Primary Examiner* — David Payne
*Assistant Examiner* — Tanya Motsinger
(74) *Attorney, Agent, or Firm* — Grossman Tucker Perreault & Pfleger, PLLC; Norman S. Kinsella

(57) ABSTRACT

A laser array optical coupling assembly may be used to couple a laser array to an arrayed waveguide grating (AWG), for example, in an optical transmitter in a wavelength division multiplexed (WDM) optical communication system. The laser array optical coupling assembly may include an optical fiber tip array with polished optical fiber tips providing a reduced mode field diameter to improve coupling efficiency with the laser array. The laser array optical coupling assembly may also include a direct coupling of the laser array to the AWG with modified AWG inputs reducing the mode field diameter to improve coupling efficiency with the laser array. The laser array optical coupling assembly may be used, for example, in an optical line terminal (OLT) in a WDM passive optical network (PON) or in other transmitters or transceivers in a WDM system capable of transmitting and receiving optical signals on multiple channel wavelengths.

12 Claims, 5 Drawing Sheets

(56) References Cited

U.S. PATENT DOCUMENTS

| | | | |
|---|---|---|---|
| 6,741,776 B2* | 5/2004 | Iwashita et al. | 385/49 |
| RE42,206 E * | 3/2011 | Mossberg | G02B 6/12004 372/102 |
| 7,965,949 B1 | 6/2011 | Wach | |
| 8,002,477 B2* | 8/2011 | Colgan | G02B 6/3636 385/120 |
| 2001/0017960 A1 | 8/2001 | Terahara | |
| 2001/0026669 A1* | 10/2001 | Nashimoto | 385/129 |
| 2003/0039437 A1* | 2/2003 | Boord et al. | 385/24 |
| 2003/0063629 A1* | 4/2003 | Davis et al. | 372/6 |
| 2003/0194185 A1* | 10/2003 | Tamura | G02B 6/14 385/39 |
| 2004/0057668 A1* | 3/2004 | Murali | G02B 6/30 385/52 |
| 2004/0057670 A1* | 3/2004 | Crafts | G02B 6/30 385/37 |
| 2004/0161194 A1* | 8/2004 | Mittelstein | G02B 6/12019 385/37 |
| 2005/0018951 A1* | 1/2005 | Mossberg | G02B 5/32 385/14 |
| 2005/0100345 A1* | 5/2005 | Welch | B82Y 20/00 398/183 |
| 2005/0180716 A1* | 8/2005 | Crafts | 385/137 |
| 2006/0193553 A1* | 8/2006 | Mossberg et al. | 385/14 |
| 2006/0215713 A1 | 9/2006 | Flanders et al. | |
| 2007/0133647 A1 | 6/2007 | Daiber | |
| 2007/0223552 A1 | 9/2007 | Muendel et al. | |
| 2008/0259972 A1 | 10/2008 | Heanue et al. | |
| 2008/0267246 A1 | 10/2008 | Volodin et al. | |
| 2010/0046949 A1* | 2/2010 | Bainbridge et al. | 398/79 |
| 2010/0265974 A1* | 10/2010 | Wang | H01S 5/4025 372/29.011 |
| 2010/0266283 A1 | 10/2010 | Beckett | |
| 2011/0085763 A1* | 4/2011 | Baugh | G02B 6/423 385/59 |
| 2011/0135309 A1 | 6/2011 | Lee et al. | |
| 2011/0216789 A1 | 9/2011 | Docter et al. | |
| 2011/0293279 A1* | 12/2011 | Lam | H04J 14/0279 398/79 |

OTHER PUBLICATIONS

Optical fiber (2001). [Online]. In Hargrave's communications dictionary, wiley. Hoboken, NJ: Wiley. Available from: http://search.credoreference.com/content/entry/hargravecomms/optical_fiber/0 [Accessed Apr. 3, 2015].*

Waveguide (2001). [Online]. In Hargrave's communications dictionary, wiley. Hoboken, NJ: Wiley. Available from: http://search.credoreference.com/content/entry/hargravecomms/waveguide/0 [Accessed Apr. 3, 2015].*

Mode field diameter (MFD) (2001). [Online]. In Hargrave's communications dictionary, wiley. Hoboken, NJ: Wiley. Available from: http://search.credoreference.com/content/entry/hargravecomms/mode_field_diameter_mfd/0 [Accessed Apr. 3, 2015].*

PCT International Search Report and Written Opinion dated Dec. 30, 2013 received in related PCT Application No. PCT/US2013/063213, 8 pgs.

US Office Action mailed Feb. 10, 2014, received in related U.S. Appl. No. 13/359,847, 16 pgs.

PCT International Search Report and Written Opinion dated Oct. 5, 2012 received in related PCT Application No. PCT/US2012/046902, 9 pgs.

PCT International Search Report and Written Opinion dated Oct. 22, 2012 received in related PCT Application No. PCT/US2012/046912, 8 pgs.

Lee, San-Liang et al, "Trend and Applications of Tunable Semiconductor Lasers", Optoelectronic Materials and Devices II, Proc. of SPIE vol. 6782, 67821H, 2007, Taipei, Taiwan R.O.C., 10 pgs.

US Office Action mailed Aug. 9, 2013, received in related U.S. Appl. No. 13/359,847, 15 pgs.

* cited by examiner

OPTICALLY MATCHED LASER ARRAY COUPLING ASSEMBLY FOR COUPLING LASER ARRAY TO ARRAYED WAVEGUIDE GRATING

TECHNICAL FIELD

The present invention relates to coupling a laser array to an arrayed waveguide grating (AWG) and more particularly, to an optically matched laser array coupling assembly for coupling a laser array to an AWG in a wavelength division multiplexing (WDM) optical network.

BACKGROUND INFORMATION

Optical communications networks have been deployed for many years. Originally, these networks were generally "point to point" type networks including a transmitter and a receiver connected by an optical fiber. Such networks are relatively easy to construct but deploy many fibers to connect multiple users. As the number of subscribers connected to the network increases, the fiber count also increases rapidly and the expense of deploying and managing many fibers becomes complex and expensive.

A passive optical network (PON) addresses this problem by using a single "trunk" fiber from a transmitting end of the network, such as an optical line terminal (OLT), to a remote branching point, which may be up to 20 km or more. Each subscriber may thus be connected to the network utilizing a much shorter fiber span forming an architecture sometimes referred to as "tree and branch." One challenge in developing such a PON is utilizing the capacity in the trunk fiber efficiently in order to transmit the maximum possible amount of information on the trunk fiber.

To improve efficiency, PONs have used "time domain multiplexing" by assigning each subscriber on the PON a particular time slot for transmission of its data along the trunk fiber. Each subscriber is allowed to transmit during its assigned time slot, and these slots are synchronized at both the transmitter and receiver such that the receiver knows the time slot (and thus the transmitter) of a transmitted signal. In this way, many transmitters can share the same fiber without fear of multiple transmitters sending data at the same time and confusing the receiver. Standards such as gigabit PON (G-PON) and Ethernet-based PON (E-PON), for example, utilize this time-dependant approach.

Although TDM-PON systems work, the TDM approach is inefficient because the system should allow sufficient time between different transmitter time slots to prevent confusion at the receiving end. Also, noise in this type of system is cumulative across all the transmitters in the PON. To avoid unwanted noise, transmitters other than the one currently transmitting may be turned off and then turned on rapidly when it is time to transmit data, without providing much stabilization time. This "burst mode" transmission makes it challenging to increase data rates in a TDM-PON system.

TDM also does not make efficient use of the bandwidth available on the fiber. Optical fiber has the ability to carry many different signals simultaneously, without interfering, as long as these different signals are carried on different wavelengths. TDM-PON systems utilize only a few wavelengths and therefore do not utilize much of the fundamental bandwidth available on the optical fiber. Similar to radio transmissions utilizing different frequencies to carry different signals, fiber optic communications networks may increase the amount of information carried on a single optical fiber by multiplexing different optical signals on different wavelengths using wavelength division multiplexing (WDM).

In a WDM-PON, a single trunk fiber carries data to and from an optical branching point and the branching point provides a simple routing function by directing signals of different wavelengths to and from individual subscribers. In this case, each subscriber is assigned a particular wavelength on which to send and/or receive data. The WDM-PON thus allows much greater bandwidth because each transmitter is allowed to transmit at a higher data rate and for a longer period of time.

One of the challenges in WDM systems, such as a WDM-PON, is coupling an array of lasers to an optical multiplexer such as an arrayed waveguide grating (AWG). Lens and/or fiber assemblies are sometimes used to provide proper optical coupling efficiency in existing systems; however, these assemblies tend to require a number of parts, which are expensive, complicated, and require space.

BRIEF DESCRIPTION OF THE DRAWINGS

These and other features and advantages will be better understood by reading the following detailed description, taken together with the drawings wherein.

DETAILED DESCRIPTION

A laser array optical coupling assembly, consistent with embodiments described herein, may be used to couple a laser array to an arrayed waveguide grating (AWG), for example, in an optical transmitter in a wavelength division multiplexed (WDM) optical communication system. The laser array optical coupling assembly may include an optical fiber tip array with polished optical fiber tips providing a reduced mode field diameter to improve coupling efficiency with the laser array. The laser array optical coupling assembly may also include a direct coupling of the laser array to the AWG with modified AWG inputs reducing the mode field diameter to improve coupling efficiency with the laser array. The laser array optical coupling assembly may eliminate the need for separate lens assemblies or other optical equipment, thus reducing cost, complexity and space requirements. The laser array optical coupling assembly may be used, for example, in an optical line terminal (OLT) in a WDM passive optical network (PON) or in other transmitters or transceivers in a WDM system capable of transmitting and receiving optical signals on multiple channel wavelengths.

As used herein, "channel wavelengths" refer to the wavelengths associated with optical channels and may include a specified wavelength band around a center wavelength. In one example, the channel wavelengths may be defined by an International Telecommunication (ITU) standard such as the ITU-T dense wavelength division multiplexing (DWDM) grid. The term "coupled" as used herein refers to any connection, coupling, link or the like by which signals carried by one system element are imparted to the "coupled" element and "optically coupled" refers to coupling such that light is imparted from one element to another element. Such "coupled" devices are not necessarily directly connected to one another and may be separated by intermediate components or devices that may manipulate or modify such signals. As used herein, "mode field diameter" refers to a measure of distribution of the irradiance, i.e., the optical power per unit area, across an end face of an optical waveguide or across a near field region of a laser.

Figure 1:
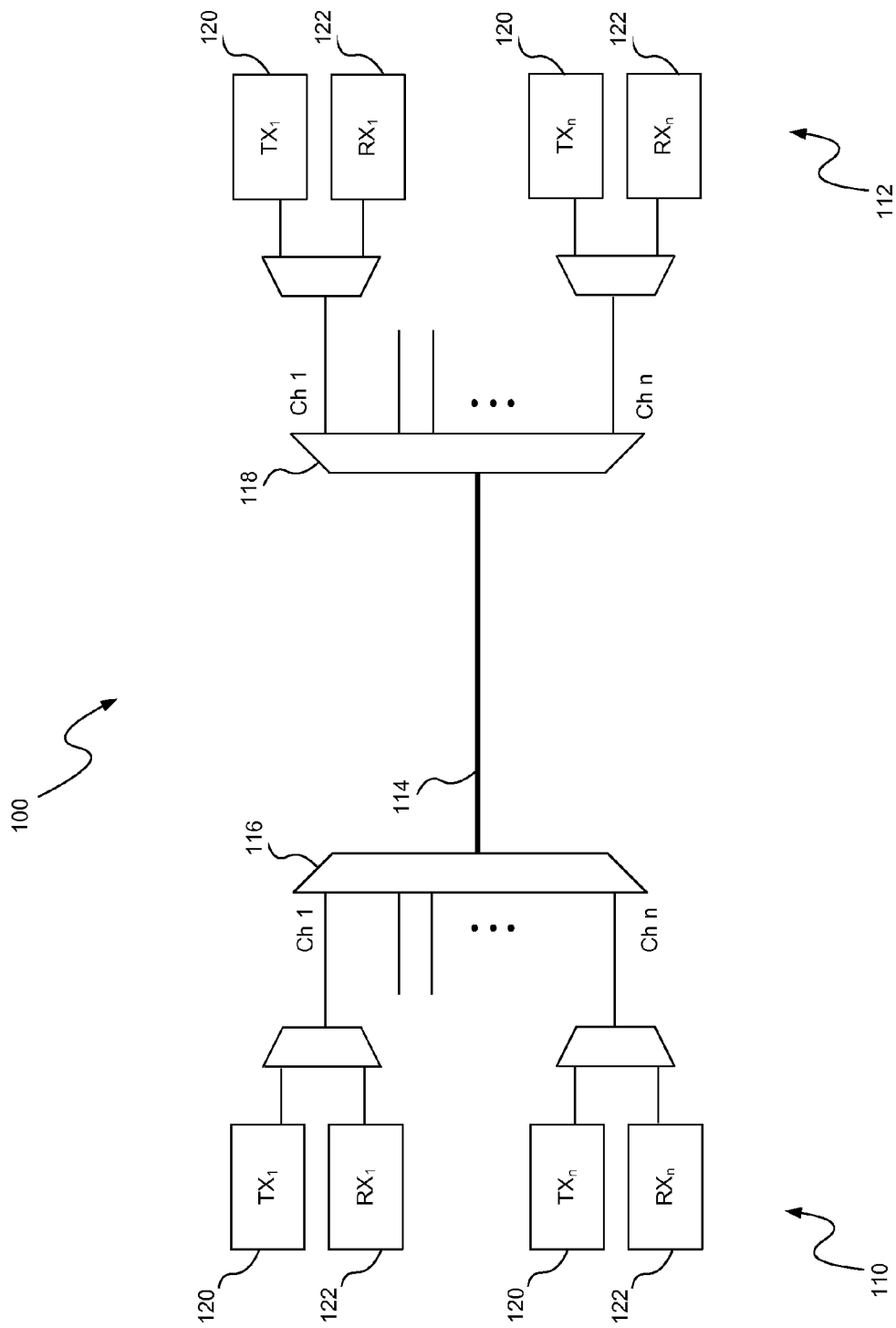
FIG. 1 is a functional block diagram of a wavelength division multiplexed (WDM) optical communication system including one or more laser array optical coupling assemblies, consistent with an embodiment of the present disclosure.

Referring to FIG. 1, a WDM optical communication system 100 including one or more laser array optical coupling assemblies, consistent with embodiments of the present disclosure, is shown and described. The WDM system 100 includes one or more terminals 110, 112 coupled at each end of a trunk optical fiber or path 114 for transmitting and receiving optical signals at different channel wavelengths over the trunk optical path 114. The terminals 110, 112 at each end of the WDM system 100 include one or more transmitters 120 (e.g., $TX_1$ to $TX_n$) and receivers 122 (e.g., $RX_1$ to $RX_n$) associated with different channels (e.g., Ch. 1 to Ch. n) for transmitting and receiving optical signals at the different channel wavelengths between the one or more terminals 110, 112. The transmitters 120 and receivers 122 may be separate or integrated as a transceiver within a terminal. Optical multiplexers/demultiplexers 116, 118 at each end of the WDM system 100 combine and separate the optical signals at the different channel wavelengths. Aggregate WDM optical signals including the combined channel wavelengths are carried on the trunk optical path 114.

The WDM system 100 may also include one or more AWGs coupled to laser arrays using a laser array optical coupling assembly, consistent with embodiments described herein. One or more of the optical multiplexers/demultiplexers 116, 118, for example, may include an AWG and the transmitters 120 may include a laser array. Additionally or alternatively, one or more of the transmitters 120 may be a tunable transmitter including a laser array coupled to an AWG for tuning to the appropriate channel wavelength, such as the type disclosed in U.S. Provisional Patent Application Ser. No. 61/508,017 and U.S. patent application Ser. No. 13/357,130, now U.S. Patent Application Publication No. 2013/0016977, both of which are incorporated herein by reference.

Figure 2:
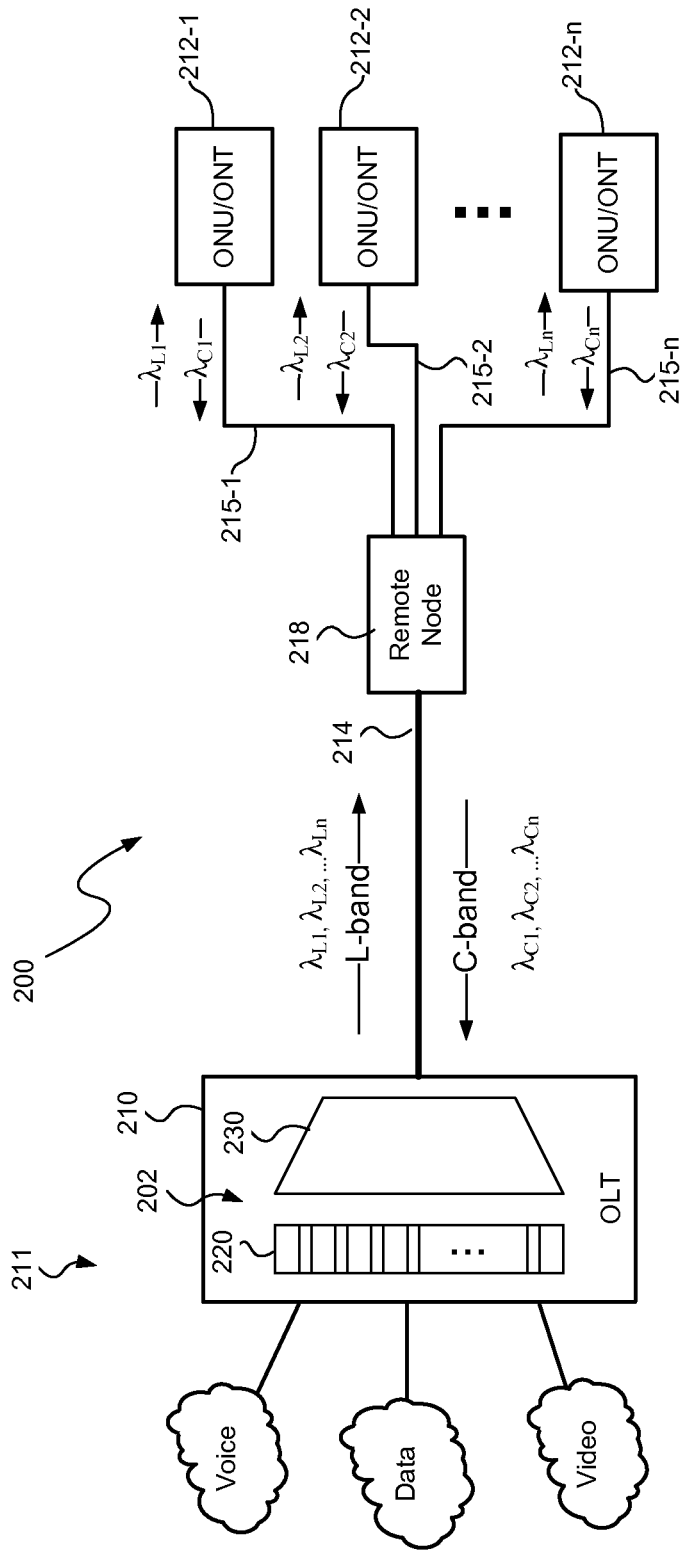
FIG. 2 is a functional block diagram of a wavelength division multiplexed (WDM) passive optical network (PON) including an optical line terminal (OLT) with at least one laser array optical coupling assembly, consistent with embodiments of the present disclosure.
Figure 4:
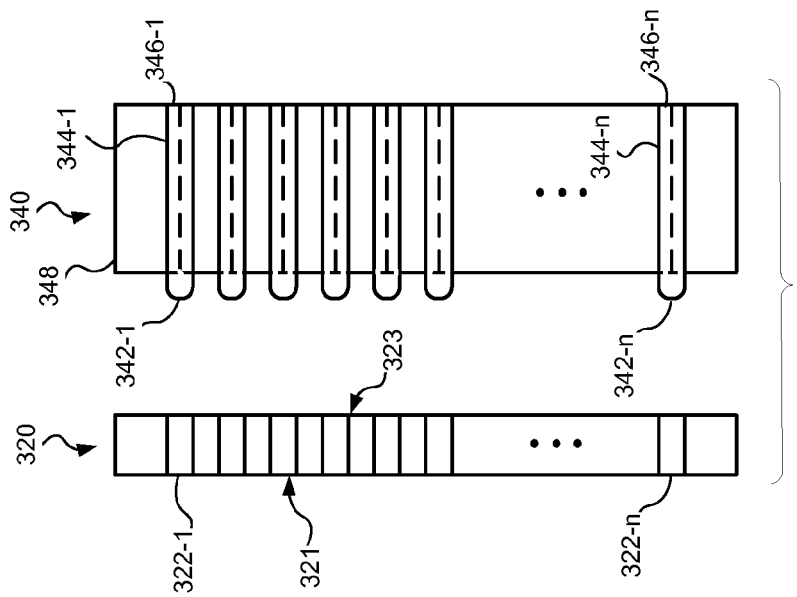
FIG. 4 is a schematic diagram of an optical fiber tip laser array coupling assembly and a laser array, consistent with embodiments of the present disclosure.
Figure 3:
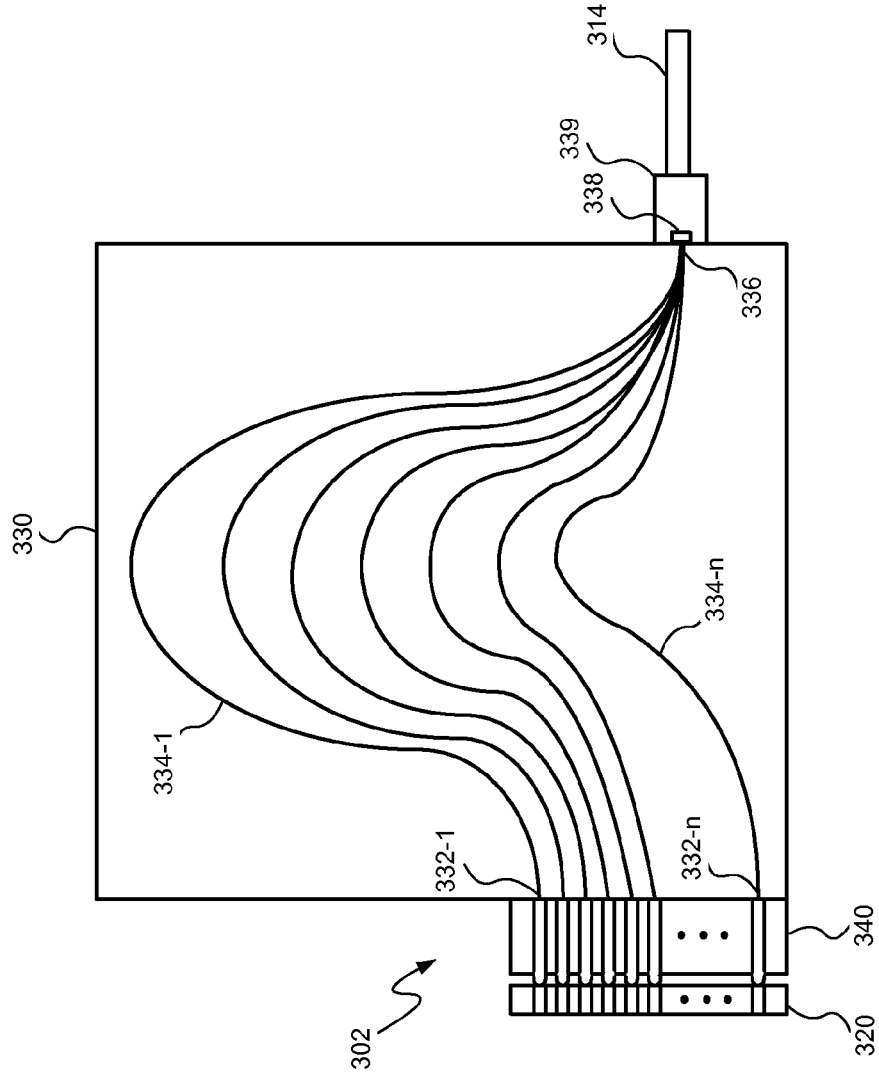
FIG. 3 is a schematic diagram of an optical fiber tip laser array coupling assembly coupling a laser array to an arrayed waveguide grating (AWG), consistent with embodiments of the present disclosure.

Referring to FIG. 2, one or more laser array optical coupling assemblies 202, consistent with embodiments of the present invention, may be used in transmitters and/or transceivers in a WDM-PON 200. The WDM-PON 200 provides a point-to-multipoint optical network architecture using a WDM system. According to one embodiment of the WDM-PON 200, a central office (CO) 211 including one or more optical line terminals (OLTs) 210 may be coupled to a plurality of optical networking terminals (ONTs) or optical networking units (ONUs) 212-1 to 212-n via optical fibers, waveguides, and/or paths 214, 215-1 to 215-n. A branching point 218 couples the trunk optical path 214 to the separate optical paths 215-1 to 215-n to the ONUs/ONTs 212-1 to 212-n at the subscriber locations. The branching point 218 may include one or more passive coupling devices such as a splitter or optical multiplexer/demultiplexer. The ONUs/ONTs 212-1 to 212-n may be located in homes, businesses or other types of subscriber location or premises.

The WDM-PON 200 may also include additional nodes or network devices, such as Ethernet PON (EPON) or Gigabit PON (GPON) nodes or devices, coupled between the branching point 218 and ONUs/ONTs 212-1 to 212-n at different locations or premises. One application of the WDM-PON 200 is to provide fiber-to-the-home (FTTH) or fiber-to-the-premises (FTTP) capable of delivering voice, data, and/or video services across a common platform. In this application, the CO 211 may be coupled to one or more sources or networks providing the voice, data and/or video.

In the WDM-PON 200, different ONUs/ONTs 212-1 to 212-n may be assigned different channel wavelengths and optical signals may be transmitted on the different channel wavelengths and combined and separated using WDM techniques. The OLT 210 may be configured to generate multiple optical signals at different channel wavelengths and combine the optical signals into an aggregate WDM optical signal carried on the trunk optical fiber or path 214. In one embodiment, the WDM-PON 200 may use different wavelength bands for transmission of downstream and upstream optical signals relative to the OLT 210. For example, the L-band (e.g., about 1565 to 1625 nm) may be used for downstream transmissions and the C-band (e.g., about 1530 to 1565 nm) may be used for upstream transmissions. Other wavelengths and wavelength bands are also within the scope of the system and method described herein.

The ONUs/ONTs 212-1 to 212-n may thus be assigned different channel wavelengths within the L-band and within the C-band. Transceivers or receivers located within the ONUs/ONTs 212-1 to 212-n may be configured to receive an optical signal on at least one channel wavelength in the L-band. In this embodiment, the OLT 110 includes the laser array optical coupling assembly 202, consistent with embodiments of the present disclosure, coupling a laser array 220 to an AWG 230 for generating optical signals at the different respective channel wavelengths (e.g., $\lambda_{L1}, \lambda_{L2}, \ldots \lambda_{Ln}$). Each of the lasers in the laser array may be modulated by a respective RF signal to generate the respective optical signals, and the AWG combines the optical signals at the different respective channel wavelengths (e.g., $\lambda_{L1}, \lambda_2, \ldots \lambda_{Ln}$).

The branching point 218 may demultiplex the downstream aggregate WDM optical signal (e.g., $\lambda_{L1}, \lambda_{L2}, \ldots \lambda_{Ln}$) from the OLT 210 for transmission of the separate channel wavelengths to the respective ONUs/ONTs 212-1 to 212-n. Alternatively, the branching point 218 may provide the aggregate WDM optical signal to each of the ONUs/ONTs 212-1 to 212-n and each of the ONUs/ONTs 212-1 to 212-n separates and processes the assigned optical channel wavelength. The individual optical signals may be encrypted to prevent eavesdropping on optical channels not assigned to a particular ONU/ONT.

Transceivers or transmitters located within the ONUs/ONTs 212-1 to 212-n may be configured to transmit an optical signal on at least one channel wavelength in the C-band. The branching point 218 combines or multiplexes the upstream optical signals (e.g., $\lambda_{C1}, \lambda_{C2}, \ldots \lambda_{Cn}$) from the respective ONUs/ONTs 212-1 to 212-n for transmission as an aggregate WDM optical signal over the trunk optical path 214. One or more of the ONUs/ONTs 212-1 to 212-n may include a tunable transmitter with a laser array optical coupling assembly coupling a laser array to an AWG for providing selected channel wavelengths.

Although examples of WDM systems are illustrated, laser array optical coupling assemblies, consistent with embodiments described herein, may also be used in other types of optical systems.

Referring to FIGS. 3-6, one embodiment of a laser array optical coupling assembly 302, consistent with embodiments of the present invention, is shown and described in greater detail. According to this embodiment, a laser array 320 is optically coupled to an AWG 330 with an optical fiber tip array 340. The laser array 320 includes a plurality of laser emitters 322-1 to 322-$n$ substantially aligned with respective AWG input ports 332-1 to 332-$n$ of the AWG 330. The optical fiber tip array 340 includes an array of polished optical fiber tips 342-1 to 342-$n$ at the ends of relatively short optical fiber segments 344-1 to 342-$n$. The polished optical fiber tips 342-1 to 342-$n$ are positioned adjacent the laser emitters 322-1 to 322-$n$ and light emitted from the laser emitters 322-1 to 322-$n$ is optically coupled directly into the polished optical fiber tips 342-1 to 342-$n$. Opposite ends 346-1 to 346-$n$ of the fiber segments 344-1 to 344-$n$ optically couple the light into the respective AWG input ports 332-1 to 332-$n$ of the AWG 330.

The AWG 330 includes waveguides 334-1 to 334-$n$ with a mode field diameter (MFD) substantially greater than a mode field diameter of the laser emitters 322-1 to 322-$n$ in the near field (e.g., 10 μm compared to 2 μm). The fiber tip array 340 improves the coupling efficiency by providing a reduced MFD at the polished fiber tips 342-1 to 342-$n$ as compared to the ends 346-1 to 346-$n$ coupled to the AWG input ports 332-1 to 332-$n$. The MFD of the laser emitters 322-1 to 322-$n$ is thus closer to the MFD of the polished optical fiber tips 342-1 to 342-$n$ than to the MFD of the AWG inputs ports 332-1 to 332-$n$. In one embodiment, the MFD of the fiber ends 346-1 to 346-$n$ substantially matches the MFD of the waveguides 334-1 to 334-$n$ at the AWG input ports 332-1 to 332-$n$ and the MFD of the polished optical fiber tips 342-1 to 342-$n$ substantially matches the MFD of the laser emitters 322-1 to 322-$n$ in the near field such that the coupling efficiency is at least about 50%.

The polished optical fiber tips 342-1 to 342-$n$ thus act like lenses that couple the emitted light into the respective AWG input ports 332-1 to 332-$n$. This allows for an improved optical coupling efficiency without using a lens array or other more complex optical fiber coupling assemblies. This configuration may reduce the overall cost, size and complexity of the system.

In one embodiment, the optical fiber segments 344-1 to 344-$n$ may include segments of single mode fibers having a length less than about 10 mm and more specifically in a range of about 2 to 6 mm. The polished fiber tips 342-1 to 342-$n$ may be polished with a radius in a range of about 5 to 10 μm. The MFD is thus reduced from a range of about 10 μm to a range of about 2 μm at the polished fiber tips 342-1 to 342-$n$.

Figure 6:
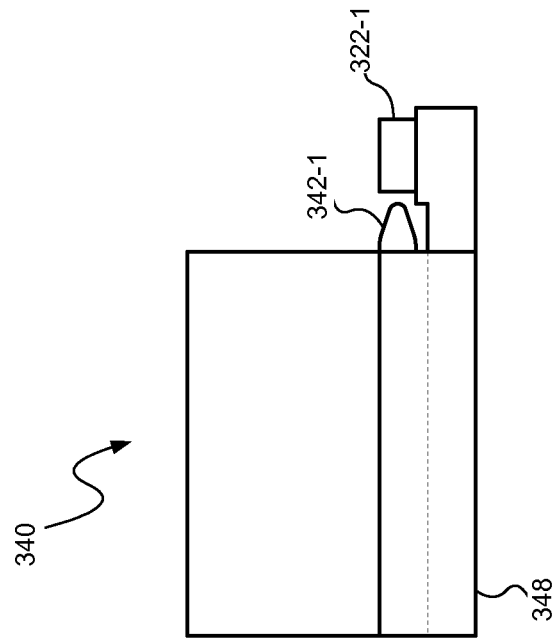
FIG. 6 is a schematic end view of an optical fiber tip laser array coupling assembly coupled to a laser chip array, consistent with embodiments of the present disclosure.
Figure 5:
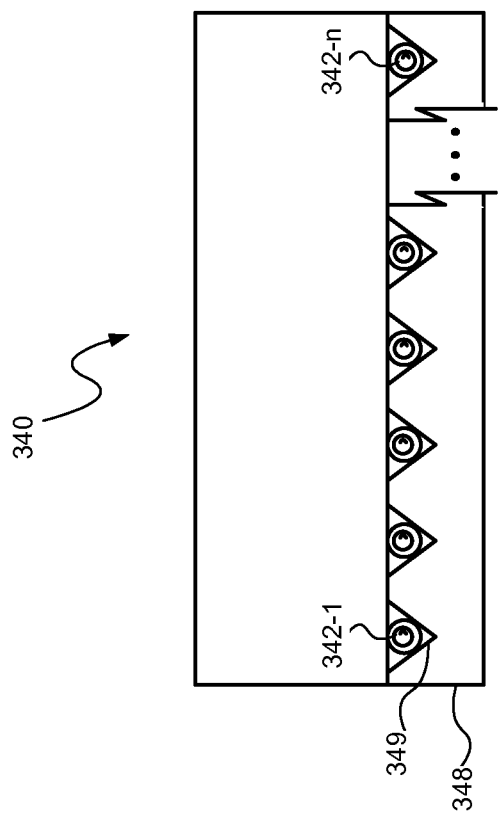
FIG. 5 is a schematic side view of an optical fiber tip laser array coupling assembly, consistent with embodiments of the present disclosure.

In the example embodiment, the optical fiber segments 344-1 to 344-$n$ (e.g., corresponding to the number of laser emitter regions 322-1 to 322-$n$) are located in a base 348 with only the polished optical fiber tips 342-1 to 342-$n$ extending from the base 348, as shown in greater detail in FIGS. 5 and 6. In one embodiment, the base 348 includes V-shaped grooves 349 for receiving and positioning the fiber segments 344-1 to 344-$n$. The V-shaped grooves 349 facilitate alignment of the fiber tips 342-1 to 342-$n$ (on the order of about 1 micron) with the laser emitters 322-1 to 322-$n$ in the laser array 320. The AWG 330 and laser array optical coupling assembly 302 may be implemented, at least in part, in a silicon optical bench (SiOB) to provide a stable platform for improved alignment of optical components.

The emitted light coupled into each of the AWG input ports 332-1 to 332-$n$ is filtered by the AWG 330 such that different waveguides 334-1 to 334-$n$ within the AWG 330 pass light of different respective channel wavelengths. The AWG 330 may be a dense WDM (DWDM) AWG with sixteen AWG inputs and waveguides for 16 channels, although other AWG configurations with other numbers of channels are within the scope of the present disclosure. In the illustrated embodiment, the waveguides in the AWG 330 are coupled to a single AWG output port 336, which is coupled to an output optical fiber 314. In one example embodiment, light emitted from multiple laser emitters 322-1 to 322-$n$ is coupled into the respective AWG input ports 332-1 to 332-$n$ and is filtered by the respective waveguides, and the AWG 330 combines the light at the different wavelengths onto the single AWG output port 336, thereby multiplexing the different channel wavelengths for transmission. In another example embodiment, light emitted from a selected one of the laser emitters 322-1 to 322-$n$ is coupled into a respective one of the AWG input ports 332-1 to 332-$n$ and filtered by the respective waveguide to output light at the corresponding wavelength on the AWG output port 336, thereby selecting a channel wavelength for transmission.

In the illustrated embodiment, a laser cavity is formed between the laser array 320 and the output of the AWG 330 using a partial reflector 338 (e.g., about 50%) to reflect light back through the AWG 330 and into gain region(s) in the laser emitters 322-1 to 322-$n$. The laser emitters 322-1 to 322-$n$ may be highly reflective (e.g., at least 80% reflective) on a rear side 321 and anti-reflective (e.g., less than 1% reflective or as small as possible) on a front side 323 coupled to the AWG 330 such that the light reflected back to the laser array 320 enters the respective laser emitter(s) 322-1 to 322-$n$. The laser emitters 322-1 to 322-$n$ amplify the reflected light and provide the gain that results in lasing when the gain exceeds the cavity losses, with the laser light being coupled into the output optical fiber 314.

The reflector 338 may include a partially reflective coating, thin film reflector, or a fiber grating (e.g., with a 50% fiber Bragg grating at the L band). When the partial reflector 338 is a fiber grating, a single port V-groove block 339 may be used to align the fiber grating with the AWG output 336.

The laser emitters 322-1 to 322-$n$ may include multiple quantum-well active regions or other gain media capable of emitting a spectrum of light across a range of wavelengths and capable of amplifying light reflected back into the gain media. The laser emitters 322-1 to 322-$n$ may include, for example, laser or gain chips such as semiconductor or diode lasers (e.g., Fabry-Perot (FP) diode lasers).

Figure 7:
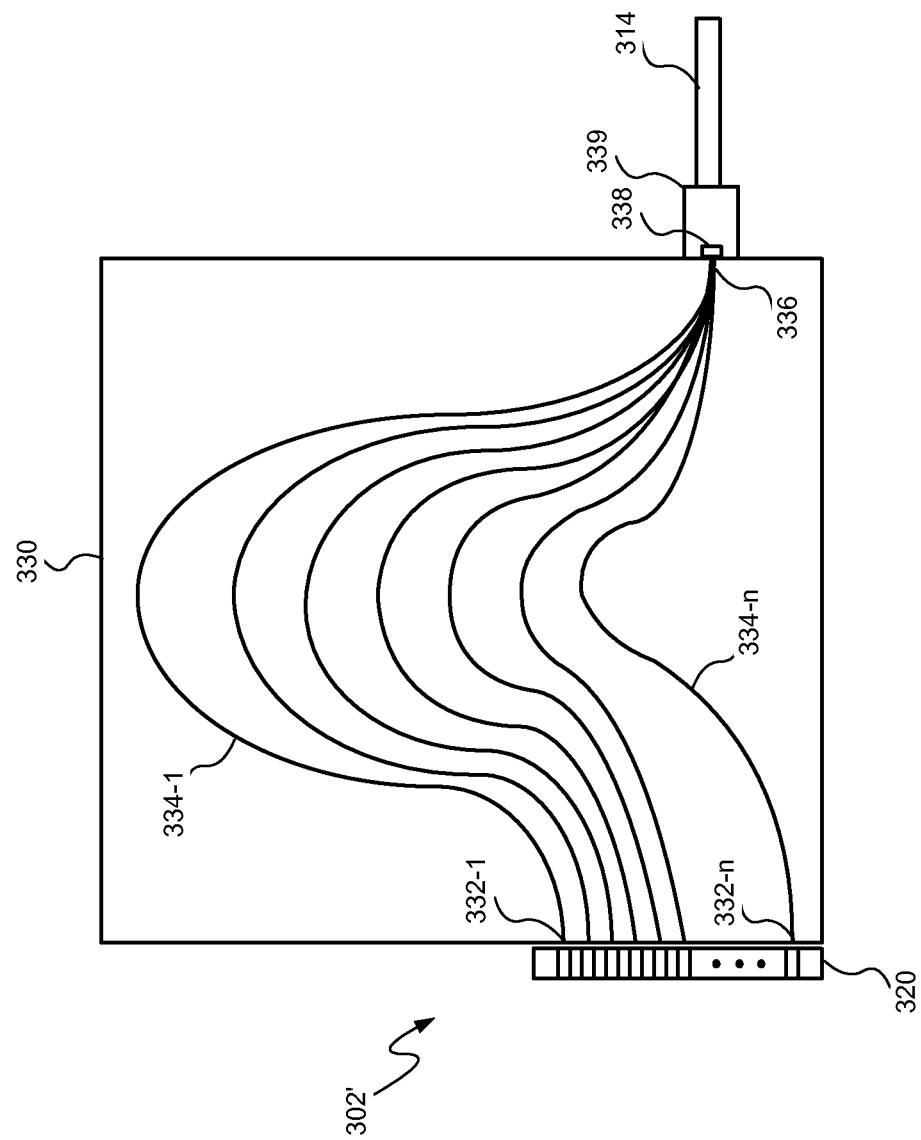
FIG. 7 is a schematic diagram of a direct laser array coupling assembly between a laser array and an AWG, consistent with another embodiment of the present disclosure

Referring to FIG. 7, another embodiment of a laser array optical coupling assembly 302', consistent with embodiments of the present disclosure, is shown and described. According to this embodiment, the laser array optical coupling assembly 302' directly couples the laser array 320 to the AWG 330. The plurality of laser emitters 322-1 to 322-$n$ are substantially aligned with and optically coupled directly to the respective AWG input ports 332-1 to 332-$n$. The MFD of the waveguides 334-1 to 334-$n$ is reduced at the AWG input ports 332-1 to 332-$n$ to be closer to the MFD of the laser emitters 322-1 to 322-$n$. In one embodiment, the MFD of the waveguides 334-1 to 334-$n$ at the input ports 332-1 to 332-$n$ is reduced to substantially match the MFD of the laser emitters 322-1 to 322-$n$ in the near field such that an optical coupling efficiency is at least about 50%.

The MFD may be reduced by increasing a refractive index of a core of the waveguides 334-1 to 334-*n* (e.g., relative to a cladding layer) and decreasing a diameter of the core of the waveguides 334-1 to 334-*n* to maintain a single mode. An AWG having a 0.75% higher index core than cladding layer may be changed to 1.5% to 2% higher core index to reduce the mode field diameter to 2 to 4 µm.

Accordingly, a laser array optical coupling assembly, consistent with embodiments described herein, is capable of coupling a laser array to an AWG with increased coupling efficiency and reduced equipment complexity, cost and space requirements.

Consistent with one embodiment, a laser array coupling assembly includes an arrayed waveguide grating (AWG) including a plurality of waveguides and AWG input ports and a laser array including a plurality of laser emitters substantially aligned with the AWG input ports. The laser array coupling assembly also includes an optical fiber tip array including a plurality of fiber segments with polished optical fiber tips. The optical fiber tip array optically couples the plurality of laser emitters to respective ones of the AWG input ports. The polished optical fiber tips are positioned adjacent to the laser emitters, respectively, such that light emitted from the laser emitters is optically coupled directly into the polished optical fiber tips.

Consistent with another embodiment, a laser array coupling assembly includes an arrayed waveguide grating (AWG) including a plurality of waveguides and AWG input ports and a laser array including a plurality of laser emitters substantially aligned with and optically coupled directly to the AWG input ports. A mode field diameter of the waveguides in the AWG is reduced at the AWG input ports.

Consistent with a further embodiment, wavelength division multiplexed (WDM) optical network includes a plurality of terminals configured to transmit and receive optical signals on multiple channel wavelengths. At least some of the terminals are associated with different respective channel wavelengths and configured to transmit and receive optical signals on the different respective channel wavelengths. At least one of the plurality of terminals includes an optical transmitter with a laser array coupling assembly. The laser array coupling assembly includes an arrayed waveguide grating (AWG) including a plurality of AWG input ports and a laser array including a plurality of laser emitters substantially aligned with and optically coupled to the AWG input ports without a lens array.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention, which is not to be limited except by the following claims.

What is claimed is:

1. A laser array coupling assembly comprising:
an arrayed waveguide grating (AWG) including a plurality of waveguides and AWG input ports;
a laser array comprising a plurality of laser emitters substantially aligned with the AWG input ports; and
an optical fiber tip array comprising a plurality of fiber segments with polished optical fiber tips, wherein the fiber segments have a length of less than about 10 mm, the optical fiber tip array optically coupling the plurality of laser emitters to respective ones of the AWG input ports, wherein the fiber segments are supported on a base with the polished optical fiber tips projecting beyond the base such that the polished optical fiber tips are positioned adjacent to the laser emitters, respectively, such that light emitted from the laser emitters is optically coupled directly into the polished optical fiber tips, wherein each of the polished optical fiber tips has a radius such that a mode field diameter of the polished optical fiber tips is less than a mode field diameter of opposite ends of the fiber segments.

2. The laser array coupling assembly of claim 1 wherein the polished optical fiber tips have a radius in a range of about 5 to 10 µm.

3. The laser array coupling assembly of claim 1 wherein the optical fiber tip array optically couples the laser emitters to the respective ones of the AWG input ports with a coupling efficiency of at least about 50%.

4. The laser array coupling assembly of claim 1 wherein the laser emitters are Fabry-Perot (FP) laser chips.

5. The laser array coupling assembly of claim 1 wherein a mode field diameter of the laser emitters in a near field is closer to a mode field diameter of the polished optical fiber tips than to a mode field diameter of the waveguides at the AWG input ports.

6. The laser array coupling assembly of claim 1 wherein a mode field diameter of the polished optical fiber tips substantially matches a mode field diameter of the laser emitters in the near field.

7. The laser array coupling assembly of claim 1 wherein the AWG and the optical fiber tip array are disposed on a silicon optical bench.

8. The laser array coupling assembly of claim 1 wherein the fiber segments are located in respective V-shaped grooves of a base.

9. A wavelength division multiplexed (WDM) optical network comprising:
a plurality of terminals configured to transmit and receive optical signals on multiple channel wavelengths, wherein at least some of the terminals are associated with different respective channel wavelengths and configured to transmit and receive optical signals on the different respective channel wavelengths, at least one of the plurality of terminals including an optical transmitter with a laser array coupling assembly comprising:
an arrayed waveguide grating (AWG) including a plurality of AWG input ports;
a laser array comprising a plurality of laser emitters substantially aligned with and optically coupled to the AWG input ports without a lens array; and
an optical fiber tip array comprising a plurality of fiber segments with polished optical fiber tips, wherein the fiber segments have a length of less than about 10 mm, the optical fiber tip array optically coupling the plurality of laser emitters to respective ones of the AWG input ports, wherein the fiber segments are supported on a base with the polished optical fiber tips projecting beyond the base such that the polished optical fiber tips are positioned adjacent to the laser emitters, respectively, such that light emitted from the laser emitters is optically coupled directly into the polished optical fiber tips, wherein each of the polished optical fiber tips has a radius such that a mode field diameter of the polished optical fiber tips is less than a mode field diameter of opposite ends of the fiber segments.

10. The WDM optical network of claim 9 wherein at least one of the terminals includes an optical line terminal (OLT) in a WDM passive optical network (PON) and configured to transmit a WDM optical signal including a plurality of channel wavelengths, and wherein others of the plurality of terminals include optical networking terminals (ONTs) configured to receive optical signals at respective ones of the channel wavelengths in the WDM-PON.

11. The WDM optical network of claim 9 wherein the laser emitters are Fabry-Perot (FP) laser chips.

12. The laser array coupling assembly of claim 9 wherein the optical fiber tip array optically couples the laser emitters to the respective ones of the AWG input ports with a coupling efficiency of at least about 50%.

* * * * *